Sept. 22, 1953      G. R. GREENBANK      2,653,084
CONTINUOUS COOKER

Filed May 4, 1949      3 Sheets-Sheet 2

INVENTOR.
George Richard Greenbank,
BY
Parker, Rodman Farmer,
Attorneys.

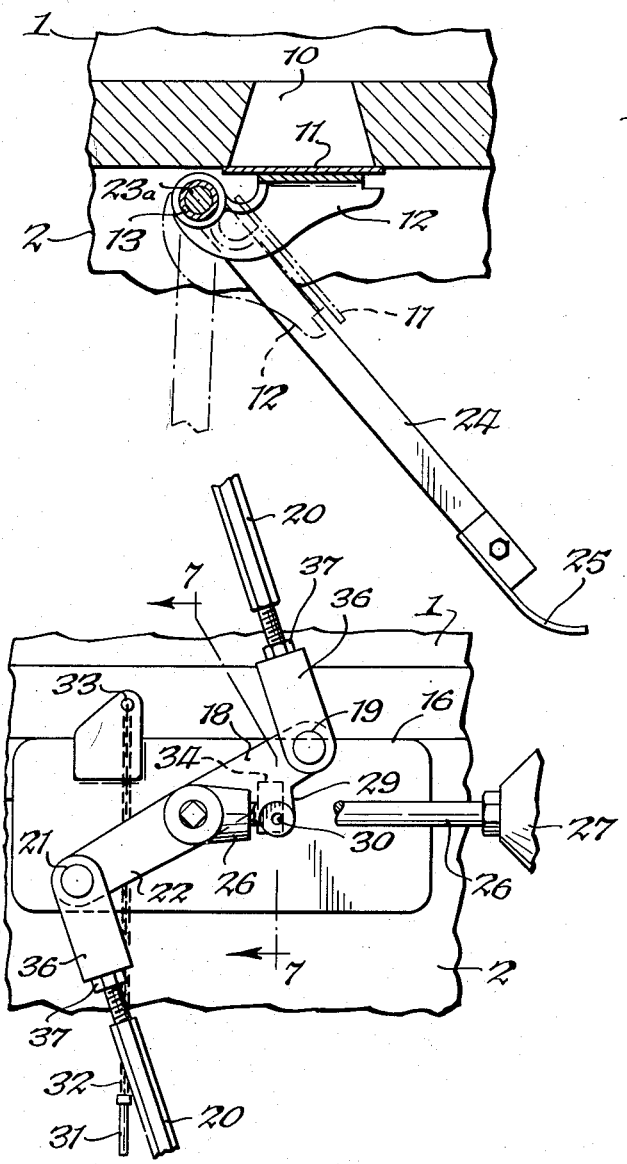

Patented Sept. 22, 1953

2,653,084

UNITED STATES PATENT OFFICE 2,653,084

CONTINUOUS COOKER

George Richard Greenbank, Piqua, Ohio, assignor to The French Oil Mill Machinery Company, Piqua, Ohio Application May 4, 1949, Serial No. 91,260

4 Claims. (Cl. 23—290.5)

This invention relates to vertical type, continuous cookers for materials of the type of seeds and nuts, which are sometimes known as toasters and cookers and driers. Cookers of this type have been made for many years with a series of kettles of cooking chambers arranged one above another, and the meal to be cooked was introduced into the uppermost chamber, heated and agitated and passed successively by gravity from chamber to chamber, and then the meal was withdrawn from the lowermost chamber and pressed in separate apparatus to express the oil. When the lowermost kettle was empty, a valve would be operated to discharge oil meal therein from the kettle next above it, and when that kettle in turn was empty, it would in turn, automatically discharge meal from the kettle about it. In this manner the meal was passed in batches from one cooking chamber to another. An example of such a cooker is illustrated in U. S. Patent No. 1,015,013 of January 16, 1912.

An object of the invention is to provide an improved method and apparatus for continuously cooking materials, with which maximum uniformity in the product may be obtained; with which maximum capacity may be obtained at all times; with which proper control of moisture and color of the materials may be obtained; with which the proper length of cooking time in the toaster may be obtained under all circumstances; and with which a high quality product may be obtained.

Another object of this invention is to provide an improved vertical type continuous cooker, which prevents the possibility of any of the chambers from running empty, and eliminates the need for a feeder on the bottom of the cooker; which insures that each section will be filled to a selected level with the materials to be cooked, except when starting up or concluding an operation of the device.

Another object of the invention is to provide an improved method and apparatus for progressively cooking materials such as seeds and nuts; which will require a minimum of manual control; which will produce a product of high quality with maximum efficiency; and which will be relatively simple, practical and inexpensive.

Other objects and advantages will be apparent from the following description of one embodiment of the invention and the novel features will be particularly pointed out hereinafter in connection with the appended claims.

In the accompanying drawings:

Fig. 5 is a sectional elevation through the part of the device shown in Fig. 4, the section being taken approximately along the line 5—5, Fig. 4;

Fig. 6 is an elevation, on a larger scale, of a part of the cooker shown in Fig. 1; and Fig. 7 is a transverse, sectional elevation through the part of the device shown in Fig. 6, the section being taken approximately along the line 7—7, Fig. 6.

Figure 1:
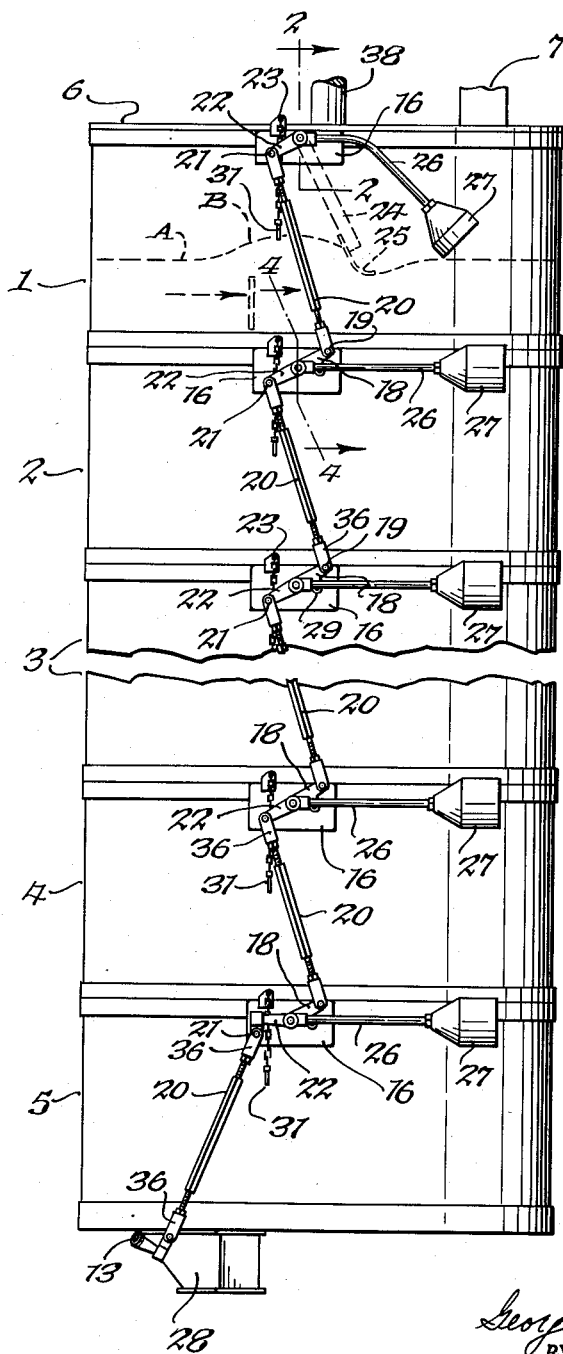
Fig. 1 is a side elevation of a cooker constructed in accordance with this invention.

In the illustrated embodiment of the invention, the improved cooker is formed of a plurality of superposed cooker sections 1, 2, 3, 4 and 5, stacked on one another with a common floor between each pair of superposed sections, and with a floor at the bottom of the lowermost section and a top 6 closing the uppermost section 1. The top 6 is provided with a suitable inlet 7 by which the materials to be cooked may be continuously fed to the uppermost cooker section 1. Each section has a cooking chamber 8, Figs. 2 and 4, and the walls of these sections are provided with steam chambers 9 by which the materials in each cooking chamber may be heated.

Figure 3:
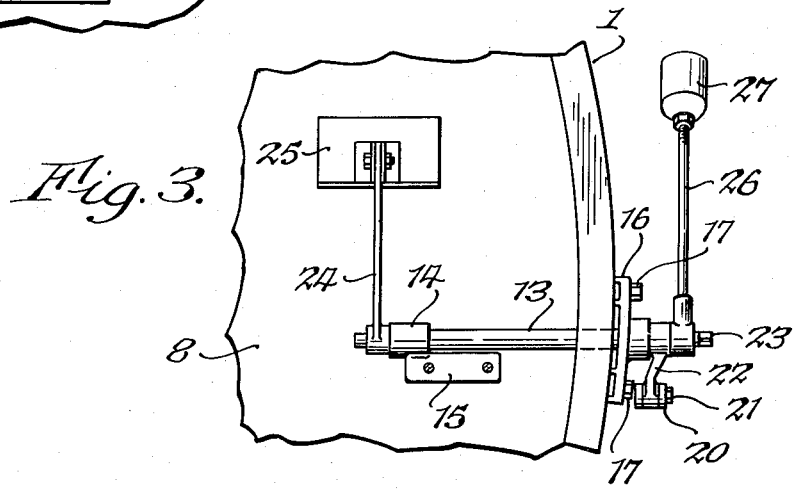
Fig. 3 is a sectional plan of a portion of the device shown in Fig. 2, the section being taken approximately along the line 3—3, Fig. 2.
Figure 4:
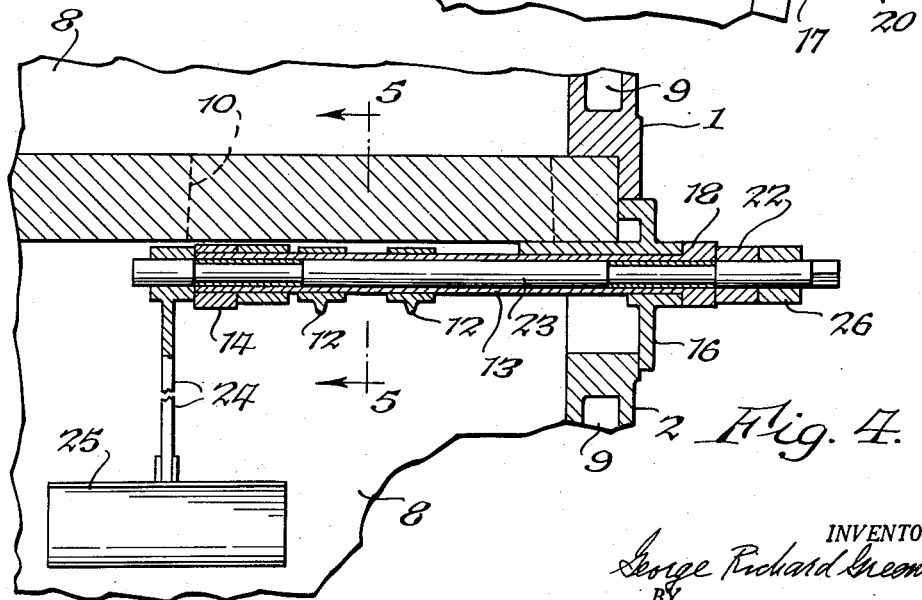
Fig. 4 is a transverse, sectional elevation of another part of the device, the section being taken approximately along the line 4—4, Fig. 1.

The floor of each of these chambers 1—5 is provided with a discharge opening or passage 10, see Fig. 5, and the lower end of each such passage 10 is closed by a suitable valve or gate 11 which is carried by arms 12, Figs. 4 and 5, that are fixed on a tube 13, Fig. 4. The tube 13 extends into the upper part of each chamber 8 at one side of the passage 10, and is rotatably supported at its inner end in a bearing 14 which is carried by the lower face of the floor plate that forms the ceiling of that chamber. The bearing 14 may be carried by a plate 15 attached to the ceiling, as shown in Fig. 3, for the chamber 8 of section 1. Each tube 13 in sections 2 to 5, at its outer end, extends through and is rotatably supported in a bearing element 16, Fig. 4, which is secured by screws or bolts 17 to the outside face of the vertical cooker (see Fig. 3).

An arm 18 is fixed upon or is integral with the outer end of each such tube 13, such as by making it integral with the tube, and this arm 18, Fig. 6, is pivotally connected by a pin 19 to the lower end of a link 20. The upper end of that link is in turn pivotally connected by a pin 21, Fig. 1, to an arm 22, which is fixed on the outer end of a shaft 23, Fig. 4, which passes through the tube 13 from end to end. Each tube 13 serves as a bearing for its shaft 23, to enable rotation of the shaft separate from the tube 13. An arm 24 is fixed upon the inner end of each such shaft 23, depends into the chamber, and at its lower end carries an arcuate plate 25 which may, for convenience, be called a float or a float plate. Also fixed on the outer end of each shaft 23 is an arm 26 which carries at its outer end a suitable weight 27. The arm 26 and weight 27 are so positioned angularly on the shaft 23 that the weight tends to rock the shaft in a direction to cause the arm 24 to depend vertically in its chamber.

The construction such as shown in Fig. 4 is provided in each of the cooker sections 2–5 inclusive, but in the upper section 1, the gate valve 12 is omitted and, consequently, the rotation of the tube 13 is not necessary and hence does not occur. This arrangement for section 1 is shown in Fig. 2, where the tube is fixed in the bearing 14 at its inner end and at its outer end is fixed in the bearing element 16. The shaft 23a rotates in this tube 13 and an arm 24 is fixed on its inner end so as to rotate therewith. The float plate 25 is secured on the lower end of the arm 24. This arrangement, as shown in Fig. 2, is the same as shown for Fig. 4, except that the tube 13 does not rotate, does not mount any gate or closure 11 and the outer end of the tube carries no arm 18. The inlet 7 is always open into the chamber 8 of the upper section 1. The outlet passage 10 in the bottom of the chamber 8 of the lowermost section 5 is valve-controlled, such valve being provided in the discharge chute or housing 28, Fig. 1, which connects with a suitable conveyor by which the cooked materials are conveyed to a press or to a solvent extraction apparatus, as may be desired.

Each lever or arm 18, Figs. 6 and 7, is provided with a depending boss 29 intermediate of its ends, and this boss is provided with an aperture 30 into which a pin 31 may be placed or from which it may be removed. The pin 31 may be attached, by a flexible chain 32, to an anchorage pin 33 on the plate 16, so that when the pin 31 is removed from the aperture 30, it cannot be lost but will be hanging close by, ready for use. The plate 16 is provided with a lug 34, Fig. 7, in the portion past which the boss 29 moves when the gate controlling arm 18 is rocked between open and closed positions. When one wishes to lock the arm 18 in the position it occupies when its gate 11 is closed, one locks the arm 16 into the full line position shown in Fig. 7, and inserts the adjacent pin 31 through boss 29, at which time the pin 31 is above and may rest upon the upper edge of the lug 34. This will prevent the gate from opening until the pin 31 is removed.

If one desires to lock the gate in open position, then the arm 18 is rocked downwardly into its lowermost position, which is shown by the dash lines in Fig. 7, and then one inserts the pin 31 through the boss 29 until the inner end of the pin is below the lower edge of the boss 34. The pin then prevents the return of arm 18 which, in turn, prevents the closing of the gate 11. After the device has been started, and until one is ready to close down the operation of the device, the pin 31 is removed from the boss 29 and hangs as shown in Fig. 6.

Each link 20 is preferably made in the nature of a turnbuckle, in which a long, hexagonal bar is threaded at its ends, the lower threaded end being threaded through the base end of a clevis 26. The clevis 36 straddles the adjacent arm 18 and is pivotally connected thereto by the pivot 19. At its upper end, each link 20 is similarly connected to a clevis 36 that straddles the free end of an arm 22 and is connected thereto by a pivot pin 21. A lock nut 37 on each threaded end of the bar 20 engages against the adjacent clevis and prevents unintentional turning of the bar 20. By turning the bar 20 relatively to the clevis on each end, the effective length of the link may be varied to some extent, which adjusts the position occupied by the float when the valve is closed.

In the operation of the device, let it be assumed that all of the kettles or cooking chambers are empty and the device is to be placed in operation. All of the gates are first locked in closed positions by shifting the arms 18 upwardly and inserting the related pin 21 through bosses 29 to rest upon the upper edges of the adjacent lugs 34. The gates are adjusted so that the level of materials in a chamber must reach certain height before the float 25 will be cammed aside or upwardly in a manner to operate the gate valve connected thereto and disposed in the next lower chamber. Assuming that all of the floats have been adjusted for the proper, desired level or depth of material, and which may be different in different chambers, the conveyor bringing the material to the inlet 7 discharges the material into the top kettle or cooking chamber.

Figure 2:
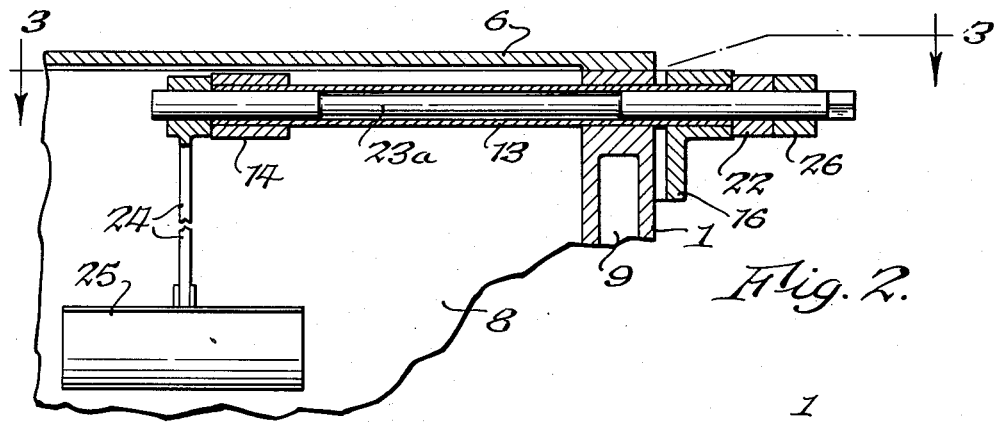
Fig. 2 is a transverse, sectional elevation of a portion of the same, the section being taken approxixmately along the line 2—2, Fig. 1.

Each chamber, as usual in this type of cooker, has a shaft 38, Fig. 1, ascending vertically through all of the chambers, and in each chamber it carries a stirrer arm 39 which rotates in that chamber, just above the floor thereof. The shaft 38 rotates continuously, and the stirrer arm 39 in each chamber sweeps the material entering each chamber evenly across the floor thereof. The arm 39, as it rotates, causes a wave in the upper surface of the loose material to travel around the chamber, as illustrated somewhat schematically in section 1 by the dash line A in Fig. 1. As the level of materials in section 1 rises, this wave, which is shown by the portion B of the dash line, will in due time become high enough to engage the float plate 25, as shown in Fig. 1, and rock the arm 24 in the upper section 1 upwardly. This will rock the shaft 23a counterclockwise in Fig. 1, and in doing so, will rock the arm 22 downwardly in Fig. 1.

The motion of arm 22 is transmitted through the attached link 20 to the arm 18 associated with the next lower cooking section 2. This arm 18 is fixed on or is integral with the tube 13 in the upper part of the chamber 8 of the cooking section 2, as shown in Fig. 4, and fixed on the tube 18 in section 2 are arms 12 that carry the gate 11 that controls the passage 10 in the floor of the upper section 1. Just before this level has been reached, however, the pin 31 in the arm 18 for section 2 is removed, so that the arm 18 may rock counterclockwise in Fig. 1 and cause the gate 11 in the floor of section 1 to open and pass some of the materials in the chamber 8 of section 2. When the level of materials in section 2 approximately reaches that at which the float in that section should be operated, one removes the pin 31 from the arm 18 for the next lower section 3 and thus, when the level in section 2 reaches a desired level, its float is operated to open the valve in its floor and start the discharge of materials by gravity into the next lower section. This procedure continues until all of the sections 1—5 have been filled. During further operation of the device, the level of materials in each of the chambers will be automatically regulated, since the float plate in each chamber automatically opens the gate in its floor and allows a discharge of material from that chamber as rapidly as necessary to maintain a constant level.

The faster that the materials are delivered to any section, the faster will the materials be discharged from that section. On the other hand, if the rate of delivery of materials to any section decreases, then the rate of discharge of materials therefrom will also decrease. Thus, the level of materials in each of the sections will be automatically maintained, irrespective of the rate of delivery of the materials to the cooker, and they will be discharged from the bottom of the cooker at the same rate that they are being delivered to the top thereof.

The float in the lowermost section 5 controls the gate valve in the discharge chute 28, so that the level in the section 5 is automatically maintained. It will be noted that there is no connection from one gate to another, and the position of the float in one chamber has no effect upon the position of the float in the next lower chamber, or in any of the chambers below it. Thus, by maintaining a uniform level of materials in each chamber, the cooking action in each chamber will be uniform, and since the discharge of material out of each section is really controlled by the input of material in the top section, this avoids any danger that any chamber will run empty, and there is no need for a feeder on the bottom of the chute 28.

The level of the materials in the different chambers may be varied, and may be higher in one chamber than another, and the selected levels in the various sections will be maintained, irrespective of the levels in the other chambers, and irrespective of the rate of delivery of the materials to the cooker. Since no chamber of the cooker becomes empty unintentionally, one obtains efficient operation and uniformity in the product, as well as maximum capacity of the cooker. One may easily control the length of time the materials spend in the cooker merely by varying the rate at which the materials are fed to the cooker.

When one desires to completely empty the cooker, the arms 18 are all rocked downwardly, each into the dash line position shown in Fig. 7, and locked in that position by inserting the pins 31 through the bosses 29 below the lugs 34. This locks all of the gates in open position so that the materials may pass downwardly from chamber to chamber and be discharged through chute 28. The weights 27 give the necessary turning torque to urge the float plates 25 downwardly, yet are responsive to the wave B, Fig. 1, when the wave reaches the desired height.

It will be understood that various changes in the details and arrangements of parts, which have been herein described and illustrated in order to explain the nature of the invention, may be made by those skilled in the art within the principle and scope of the invention as expressed in the appended claims.

I claim:

1. A vertical type, continuous cooker, comprising a plurality of successively superposed, heated cooking chambers, each chamber above the lowest having a discharge opening solely in its bottom leading to the next lower chamber, and the lowest chamber having a final discharge opening, the top chamber having an uncontrolled inlet leading thereto, a tube extending into each chamber below the top chamber, and rockably mounted, a closure fixed on said tube within the chamber and movable, when the tube rocks into and out of a position in which it closes the discharge opening from the chamber above it, a shaft passing through said tube, rockable in it, and having a float member fixed to its inner end and an arm on its outer end, an arm on the outer end of said tube, a link continuously and drivingly connecting each arm on a shaft with the arm on a tube in the next lower chamber for movement in both directions, a shaft extending into the top chamber and at its inner end having a float member fixed thereon and at its outer end having an arm fixed thereon, a link continuously and drivingly connecting said last mentioned arm to the arm fixed on the tube in the next lower chamber for movement in both directions, the float member in each chamber when rising causing an opening of the closure for the discharge opening from that chamber, and vice versa, a closure for the final discharge opening of the lowest chamber, and an operating link connecting said last mentioned closure to the arm on the shaft in the lowest chamber for movement in both directions to open the lowest closure when the level of materials in the lowest chamber is above a selected level and close it when that level is below said selected level.

2. A vertical type, continuous cooker, comprising a plurality of successively superposed, heated cooking chambers each chamber above the lowest having a discharge opening solely in its bottom leading to the next lower chamber, and the lowest chamber having a final discharge opening, the top chamber having an uncontrolled inlet leading thereto, a tube extending into each chamber below the top chamber, and rockably mounted, a closure fixed on said tube within the chamber and movable, when the tube rocks into and out of a position in which it closes the discharge opening from the chamber above it, a shaft passing through said tube, rockable in it, and having a float member fixed to its inner end and an arm on its outer end, an arm on the outer end of said tube, a link connecting each arm on a shaft with the arm on a tube in the next lower chamber to move it in both directions, a shaft extending into the top chamber and at its inner end having a float member fixed thereon, and at its outer end having an arm fixed thereon, a link connecting said last mentioned arm to the arm fixed on the tube in the next lower chamber to move it in both directions, the float member in each chamber when rising causing an opening of the closure for the discharge opening from that chamber, and vice versa, a closure for the final discharge opening of the lowest chamber, an operating link connecting said last mentioned closure to the arm on the shaft in the lowest chamber to move it in both directions and open the lowest closure when the level of materials in the lowest chamber is above a selected level, and a stirrer arm movable in each of said chambers to cause a wave of said materials to travel in that chamber along a selected path and operate the float member in that chamber whenever the crest of the wave is above a selected level.

3. A vertical type, continuous cooker, comprising a plurality of successively superposed, heated cooking chambers, each chamber above the lowest having a discharge opening solely in its bottom leading to the next lower chamber, and the lowest chamber having a final discharge opening, the top chamber having an uncontrolled inlet leading thereto, a tube extending into each chamber below the top chamber, and rockably mounted, a closure fixed on said tube within the chamber and movable, when the tube rocks, into and out of a position in which it closes the discharge opening from the chamber above it, a shaft passing through said tube, rockable in it, and having a float member fixed to its inner end and an arm on its outer end, an arm on the outer end of said tube, a link drivingly connecting each arm on a shaft with the arm on a tube in the next lower chamber to move it in both directions, a shaft extending into the top chamber and at its inner end having a float member fixed thereon and at its outer end having an arm fixed thereon, a link drivingly connecting said last mentioned arm to the arm fixed on the tube in the next lower chamber to move it in both directions, the float member in each chamber when rising causing an opening of the closure for the discharge opening from that chamber, and vice versa, a closure for the final discharge opening of the lowest chamber, an operating link drivingly connecting said last mentioned closure to the arm on the shaft in the lowest chamber to move it in both directions and open the lowest closure when the level of materials in the lowest chamber is above a selected level and close it when said level falls below said selected level, and a weighted arm fixed on each shaft for continuously yieldingly rocking the shaft to lower the float member fixed thereon and move the connected closure into closed position.

4. A vertical type, continuous cooker, comprising a plurality of successively superposed, heated cooking chambers, each chamber above the lowest having a discharge opening solely in its bottom leading to the next lower chamber, and the lowest chamber having a final discharge opening, the top chamber having an uncontrolled inlet leading thereto, a tube extending into each chamber below the top chamber, and rockably mounted, a closure fixed on said tube within the chamber and movable, when the tube rocks, into and out of a position in which it closes the discharge opening from the chamber above it, a shaft passing through said tube, rockable in it, and having a float member fixed to its inner end and an arm on its outer end, an arm on the outer end of said tube, a link drivingly connecting each arm on a shaft with the arm on a tube in the next lower chamber to move it in both directions, a shaft extending into the top chamber and at its inner end having a float member fixed thereon, and at its outer end having an arm fixed thereon, a link drivingly connecting said last mentioned arm to the arm fixed on the tube in the next lower chamber to move it in both directions, the float member in each chamber when rising causing an opening of the closure for the discharge opening from that chamber, and vice versa, a closure for the final discharge opening of the lowest chamber, an operating link drivingly connecting said last mentioned closure to the arm on the shaft in the lowest chamber to move it in both directions and open the lowest closure when the level of materials in the lowest chamber is above a selected level and close it when said level is below said selected level, a weighted arm fixed on each shaft for continuously and yieldingly rocking the shaft to lower the float member fixed thereon and move the connected closure into closed position, and a stirrer arm movable in each of said chambers to cause a wave of said materials to travel in that chamber along a selected path and operate the float member in that chamber whenever the crest of the wave is above a selected level.

GEORGE RICHARD GREENBANK.

References Cited in the file of this patent

UNITED STATES PATENTS

| Number | Name | Date |
|---|---|---|
| 1,112,128 | Faherty | Sept. 29, 1914 |
| 1,161,041 | French | Nov. 23, 1915 |
| 1,407,965 | Ware | Feb. 28, 1922 |
| 1,431,107 | Faherty | Oct. 3, 1922 |